United States Patent [19]

Sutton

[11] Patent Number: 4,638,305
[45] Date of Patent: Jan. 20, 1987

[54] APPARATUS FOR DETECTING WATER IN FUEL

[75] Inventor: Stephen J. Sutton, Fenton, Mich.

[73] Assignee: General Motors Corporation, Detroit, Mich.

[21] Appl. No.: 714,887

[22] Filed: Mar. 22, 1985

[51] Int. Cl.$^4$ .................... G08B 21/00; H01H 29/00
[52] U.S. Cl. .................................... 340/620; 340/59;
340/603; 73/304 R; 73/304 C; 200/182;
200/190; 200/61.04; 200/DIG. 41; 324/61 P;
324/62; 324/65 R; 324/65 CR; 210/86
[58] Field of Search ............... 340/59, 620, 603, 604;
73/304 R, 304 C, 61 R, 61.1 R, 64; 324/61 R,
61 P, 60 R, 60 C, 62, 61 GS, 61 QL, 65 R, 65
CR; 200/DIG. 40, 182, 185, 190, 61.04, 61.05,
DIG. 41; 210/85, 86

[56] References Cited

U.S. PATENT DOCUMENTS

| | | | |
|---|---|---|---|
| 3,694,804 | 9/1972 | Hill | 340/59 |
| 4,001,676 | 1/1977 | Hile et al. | 73/304 C |
| 4,227,173 | 10/1980 | Clark | 340/620 |
| 4,316,174 | 2/1982 | Sutton et al. | 340/59 |
| 4,356,406 | 10/1982 | Bartels | 340/620 |
| 4,377,550 | 3/1983 | Tokarz | 340/620 |
| 4,389,889 | 6/1983 | Larson | 340/620 |
| 4,470,301 | 9/1984 | Hutchins et al. | 340/620 |
| 4,497,204 | 2/1985 | Kobayashi | 340/620 |
| 4,517,547 | 5/1985 | Gray et al. | 340/59 |

Primary Examiner—Donnie L. Crosland
Attorney, Agent, or Firm—Warren D. Hill

[57] ABSTRACT

Diesel fuel tends to deposit an insulating coating on surfaces it contacts. A probe, preferably in the form of a siphon tube, is coupled to a detection circuit which is responsive to either low resistance or high capacitance between the probe and ground. The probe is initially uncoated to make a resistive coupling to a fuel container when accumulated water touches the probe. When insulating deposits from the diesel fuel or other fuel oil coat the probe, capacitive coupling will occur between the probe and the accumulated water. In either case the presence of water triggers an output signal by the detection circuit.

3 Claims, 3 Drawing Figures

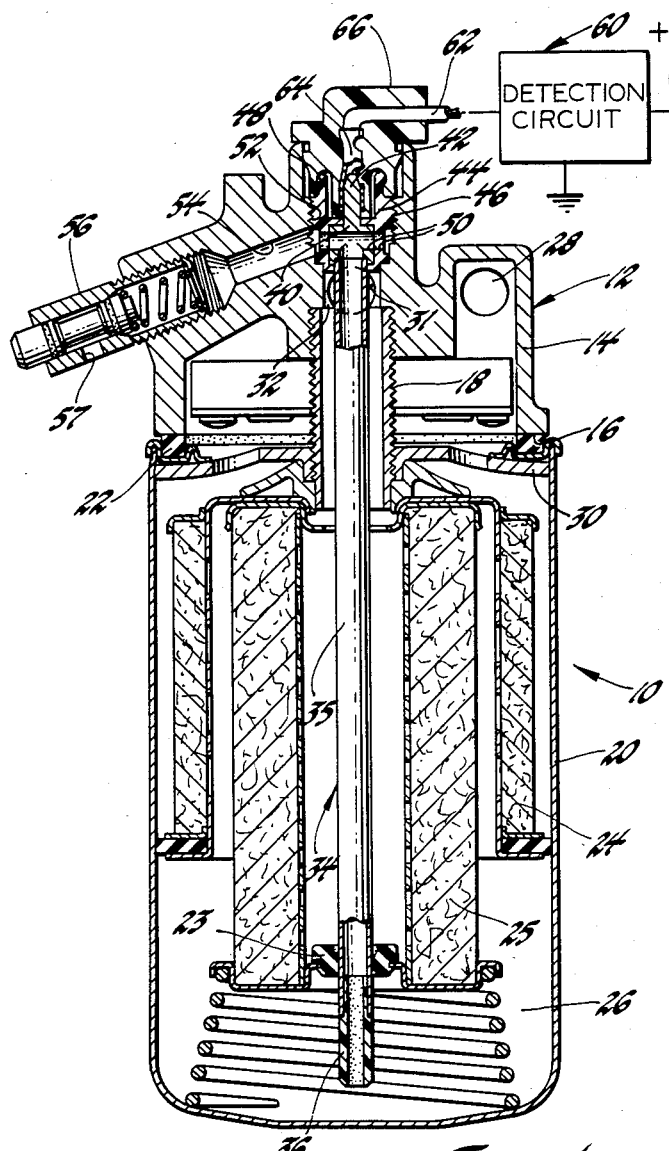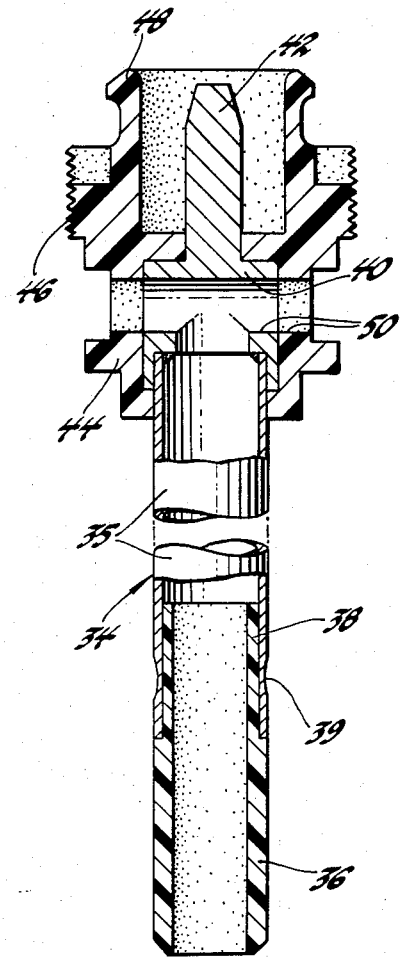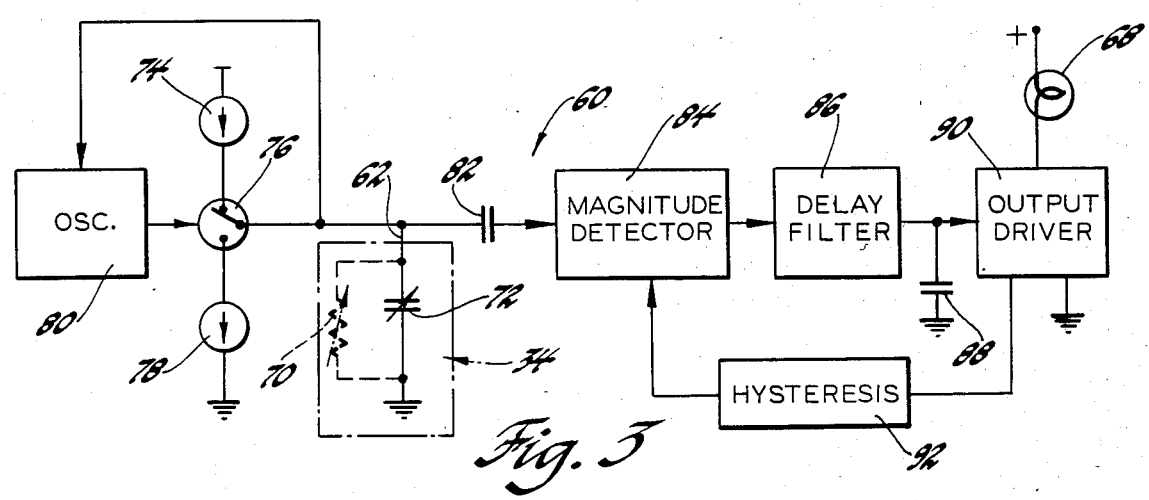
Fig. 1
Fig. 2
Fig. 3

APPARATUS FOR DETECTING WATER IN FUEL

FIELD OF THE INVENTION

This invention relates to apparatus for detecting water accumulation in a fuel container, particularly in a container of diesel fuel and the like.

BACKGROUND OF THE INVENTION

Fuel tanks containing diesel fuel or other fuel oil are subject to the accumulation of water in the bottom of the tank. Since the water does not mix with the fuel oil it must occasionally be drained from the tank. In some cases to assure that water does not reach the engine or other utilization device a fuel conditioner is employed to separate the water from the fuel in a filter-like canister. In either case, the tank or the canister should be equipped with means for determining when the water level reaches an unacceptable height and for producing a signal indicating that the high water level has been reached and the water should be removed from the container. A desirable method for removing the water is by a siphon tube extending to the bottom of the container which allows the water to be removed by suction.

Known devices for detecting water level in a fuel container include resistive probes and capacitive probes. The resistive probes depend upon insulating qualities of the fuel oil to establish a high resistive impedance between a probe and the walls of the container, and if water is present in sufficient quantities to contact the probe then a low resistance path between the probe and the container will be established. A circuit is provided for detecting the low resistance due to the presence of water and providing a suitable output indication. A problem with the resistive probe is that the fuel oil tends to form a nonconducting layer of oil or a deposit from the oil, and in addition, there is a tendency for a bacterial sludge to grow on the probe surface at the water/oil interface. The insulating coating on the probe thus prevents its proper operation as a resistive probe and its function deteriorates as the coating builds up over a period of usage. A capacitive probe, for example, as disclosed in the U.S. Pat. No. 4,316,174, to Sutton et al has a dielectric coating so that the conductive portion of the probe is one plate of a capacitor and conductive water surrounding a portion of the probe is the other plate. The build up of an additional dielectric coating decreases the capacitance of the probe but it is still operable. However, the capacitive probe has a drawback in that the probe must have a dielectric coating of high integrity. That is, no pin holes or other resistive leaks are allowable so that when the probe is new or has just been cleaned it will maintain its capacitive characteristics. As a practical matter, this limits the probes to very simple geometries which allow a high quality coating to be applied. A tube, for example, is difficult to coat internally. Even in the case of simple geometries the high quality dielectric coating is an expensive aspect of probe fabrication.

SUMMARY OF THE INVENTION

A general object of the invention is to provide an apparatus for detecting water in diesel fuel or fuel oil which requires no dielectric coating on the probe, yet is operative in the event of a dielectric deposit on the probe. Another object of the invention is to provide an apparatus for detecting water in diesel fuel which is operative in a resistive mode as well as in a capacitive mode.

The invention is carried out by a conductive probe for location in a fuel container which when in contact with water will be resistively coupled to the container in the absence of insulating deposits and which will be capacitively coupled to the water when covered with insulating deposits, and a detection circuit coupled to the probe which is responsive to low probe resistance or high probe capacitance for generating an output signal indicative of water contact with the probe. The invention further comprehends the use of a water siphon tube as the probe so that a dual function is obtained.

The above and other advantages of the invention will become more apparent from the following description taken in conjunction with the drawings wherein like reference numerals refer to like parts and wherein:

BRIEF DESCRIPTION OF THE INVENTION

FIG. 1 is cross-sectional elevation of a diesel fuel conditioner containing a water-in-fuel detector probe connected to detection circuitry in the form a block diagram according to the invention, FIG. 2 is an enlarged view of the probe of FIG. 1, and FIG. 3 is a block diagram of a water-in-fuel detection circuit of FIG. 1.

DESCRIPTION OF THE PREFERRED EMBODIMENTS

Referring to FIG. 1 a fuel conditioner 10 for separating water from diesel fuel or the like comprises a cast head member 12 which includes an outer annular skirt 14 terminating in a lower annular seat 16. A dependent central tubular nipple 18 threadedly secures a canister 20 such that a gasket 22 on the upper rim of canister 20 seals against the seat 16. The canister contains two annular concentric filters 24 and 25 which separate water from the oil and includes a reservoir portion 26 beneath the filters to allow the accumulation of water. An inlet 28 in the cap 12 allows fuel oil to flow through a perforated top 30 of the canister and thence radially inwardly through the filters 24 and 25 to a central region in communion with the nipple 18. An outlet 31 is connected to a central bore 32 of the cap which in turn is connected to the internal portion of the nipple 18, thereby allowing flow from the cap. A combination siphon tube and water detection probe 34 extends axially of the cap through the bore 32, the nipple 18, the inner filter 25 and an apertured grommet 23 in the bottom of the filter 25 and terminates at a point close to the bottom of the canister in the reservoir 26.

As best shown in FIG. 2, the probe 34 comprises a steel tube 35 with a special fitting on each end. The lower end supports an insulating polymer tubular extension or tip 36 which has an inner sleeve 38 extending upwardly inside the tube 35 and is secured within the tube by a crimp 39 in the tube 35. At the upper end of the probe a metal terminal 40 seats on the end of the tube and has an upwardly extending spade portion 42 to form a male electrical connector. The terminal 40 is soldered to the tube 35 and is surrounded by an insert molded polymer element 44 having an externally threaded circumference 46 and defining an annular wall 48 surrounding the spade 42. Radial ports 50 formed in both the terminal 40 and the polymer molding 46 communicate with the interior of the tube 35. As shown in FIG. 1, the threaded fitting 46 is received in a mating bore 52 in the center of the cap 12 so that the ports 50 connect to the lower portion of the bore 52. A lateral passage 54 in the cap 12 extends from the bore 52 outwardly to a valve 56 having a vent 57. In use, the canister is usually pressurized by a fuel pump. When the valve 56 is manually opened water is expelled from the reservoir 26 through the probe 34 and out through the ports 50, the passage 54 and the vent 57. Since a water detection signal is not given until the water level covers a portion of the metal tube 35 of the probe 34, the insulating extension 36 on the probe will terminate at a point well below the water surface and thereby allow the water to be siphoned out of the canister.

The water-in-fuel detection circuit 60 is coupled through a lead 62 to a clip 64 on the terminal spade 42 and is surrounded by a resilient protective grommet 66. Another lead on the detection circuit 60 is connected through an indicator lamp 68 to a voltage source. As shown in FIG. 3, the water-in-fuel detection circuit 60 depicts the probe 34 as a parallel combination of a resistor 70 and a capacitor 72 which represent the coupling between the probe and ground which is the shell of the canister or the water itself. The water collecting in a fuel system will not be sufficiently pure to be a good insulator but it may be a good conductor. When the probe 34 is clean and not coated with a nonconductive deposit from the fuel it will, if in contact with the water, form a low resistance connection with the grounded canister. As a film builds up over time the resistance will increase and the capacitive couplinc with the water becomes dominant. The circuit then must respond to the high capacitance or low capacitive reactance as well as to the low resistance, either of which may result when the probe makes substantial contact with water.

The detection circuit, which is preferably in the form of an integrated circuit, comprises a first constant current source 74 connected between a voltage supply and an electronic switch 76 and a second current source 78 like the source 74 coupled between the switch 76 and ground. An oscillator 80 operates the switch 76. One terminal of the switch 76 is connected to the lead 62 which extends to the probe 34 as well as to a reference capacitor 82 which is serially coupled to the input of a current magnitude detector 84. The magnitude detector 84 has its output connected to a delay filter 86 having an external capacitor 88 which determines the delay time and the filter output is connected to the input of an output driver 90. The output driver is coupled to the signal lamp 68 which in turn is coupled to a power supply so that when the output driver is actuated the lamp is connected to ground to cause lamp illumination. The output driver is also connected to a hysteresis circuit 92 which feeds back to the magnitude detector 84.

In operation, the oscillator 80 alternately couples the current sources 74 and 78 to the probe 34 and capacitor 82 for equal time periods thereby applying equal amounts of charging current and discharging current. The magnitude of current flow through the reference capacitor 82 depends upon the impedance of the probe 34. When the probe 34 is not in contact with water it will exhibit a high resistance or a low capacitance so that a relatively large proportion of the current flows through the reference capacitor 82. The magnitude detector 84 is off under such conditions and turns on only when the current in capacitor 82 drops below a threshold level. That low current occurs when the probe is in contact with water so that the resistance 70 becomes low or the capacitance 72 becomes high. Then the magnitude detector 84 emits an output to the delay filter 86 and thence to the output driver 90 to actuate the signal lamp 68. The delay filter 86 acts to prevent a signal to the output driver whenever the detector output is a transient signal due to, for example, electrical noise or sloshing of liquid within the container. At the same time the hysteresis circuit 92 is actuated to adjust the threshold on the magnitude detector 84 to assure that the indicator lamp 68 will remain actuated until the input signal returns to a lower value upon the removal of water from the container. The reference capacitor 82 is selected to establish the desired sensitivity of the probe. A small capacitor will provide more sensitivity than a larger one. In making the selection it should be kept in mind that the probe will become less sensitive as an insulating deposit accumulates. It is desirable for the unit to issue a signal when the water level reaches ¼ inch above the bottom of the metal tube 35.

It will thus be seen that according to this invention a bare probe is able to detect water in diesel or other fuel, even though it becomes coated with a deposit of oil or a bacterial sludge, thereby allowing the manufacture of probes without a dielectric coating which in the case of a tubular probe, for example, greatly reduces the cost of manufacture.

The embodiments of the invention in which an exclusive property or privilege is claimed are defined as follows:

1. Apparatus for detecting water in a fuel container wherein the fuel has a tendency to deposit an insulating coating on surfaces it contacts, comprising
   a conductive probe for location in a conductive fuel container at a level to contact water that may collect in the container, so that the probe when contacting the water in the absence of an insulating coating, will be resistively coupled to the container and when contacting the water while covered with an insulating coating will be capacitively coupled to the container, and
   a detection circuit coupled to the probe and having means responsive to low probe resistance or high probe capacitance for generating an output signal indicative of water contact with the probe.

2. Apparatus for detecting water in a fuel container as described in claim 1 wherein the probe is a metal tube mounted above and extending to the said level for withdrawing water from the container.

3. Apparatus for detecting water in a fuel container as described in claim 2 wherein a non-conductive extension is mounted on the lower end of the probe to place the tube opening below water level when water contact with the metal probe is indicated.

* * * * *